United States Patent [19]

Gifford et al.

[11] Patent Number: 5,453,792
[45] Date of Patent: Sep. 26, 1995

[54] DOUBLE VIDEO STANDARDS CONVERTER

[75] Inventors: Christopher S. Gifford, San Jose; Leonard K. Moeller, Santa Clara, both of Calif.

[73] Assignee: Prime Image, Inc., Saratoga, Calif.

[21] Appl. No.: 210,812

[22] Filed: Mar. 18, 1994

[51] Int. Cl.$^6$ ............................................. H04N 7/01
[52] U.S. Cl. ................................. 348/441; 348/443
[58] Field of Search ........................ 348/443, 441, 348/458, 459, 454, 911; H04N 7/01

[56] References Cited

U.S. PATENT DOCUMENTS

| | | | |
|---|---|---|---|
| 4,523,227 | 6/1985 | Hurst | 348/459 |
| 4,843,468 | 6/1989 | Drewery | 348/441 |
| 5,072,296 | 12/1991 | Lim | 348/459 |
| 5,115,311 | 5/1992 | Jaqua | 348/458 |
| 5,353,119 | 10/1994 | Dorricott et al. | 348/459 |

FOREIGN PATENT DOCUMENTS 0023692  1/1987  Japan ................................ 348/459

Primary Examiner—Victor R. Kostak
Attorney, Agent, or Firm—Graham & James

[57] ABSTRACT

A double standards converter for converting video signals formatted according to a first standard having a slower frame rate to a second standard having a faster frame rate prior to intermediate signal processing, and for converting the signals resulting from the intermediate signal processing to a third format having the same frame rate as the original video signals. The input video signals are first time base corrected and then converted to the second format repeating a frame in a periodic manner related to the time ratios between the first and second frame rates. After intermediate signal processing, the resulting signals are converted to the third format having the slower frame rate by deleting each repeated frame. Each repeated frame presented to the intermediate signal processor is excepted from the intermediate signal processing in order to avoid the introduction of discontinuities when the leading and trailing frames are joined by deleting the repeated frame. Any signal delay introduced by the intermediate signal processing is compensated for by synchronizing the performance of the read and write operations for both the first and second standards conversion.

6 Claims, 2 Drawing Sheets

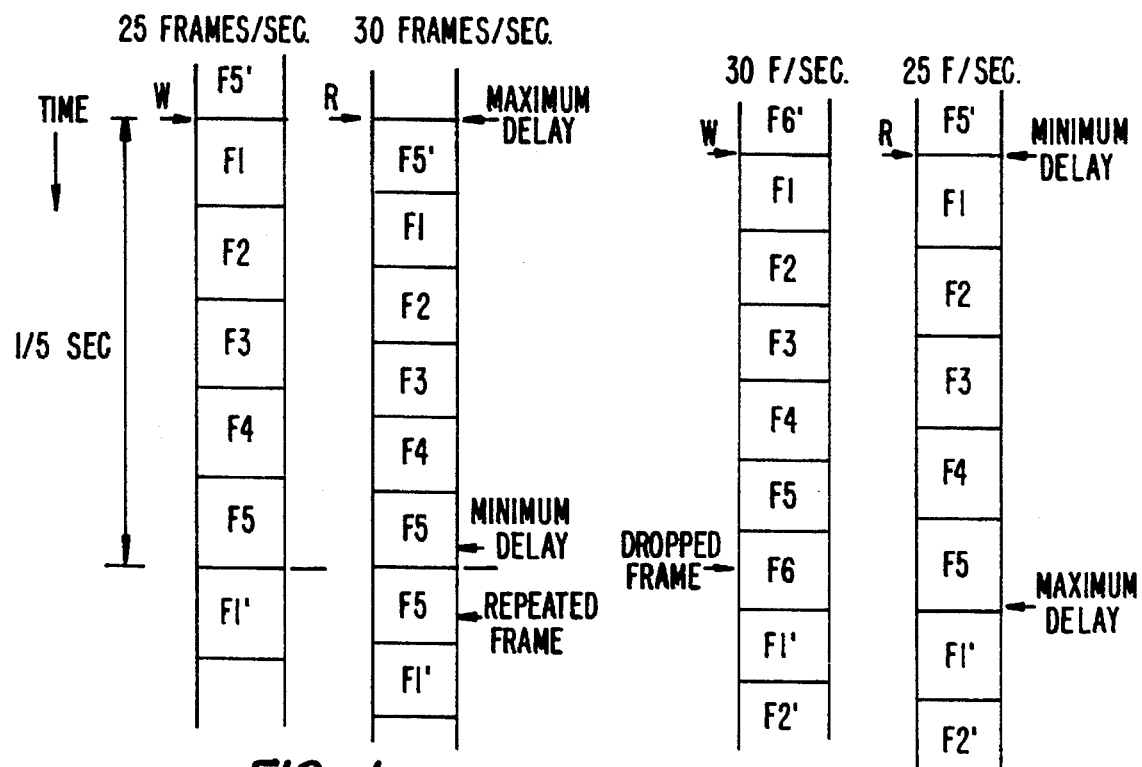
FIG. 1.
FIG. 2.
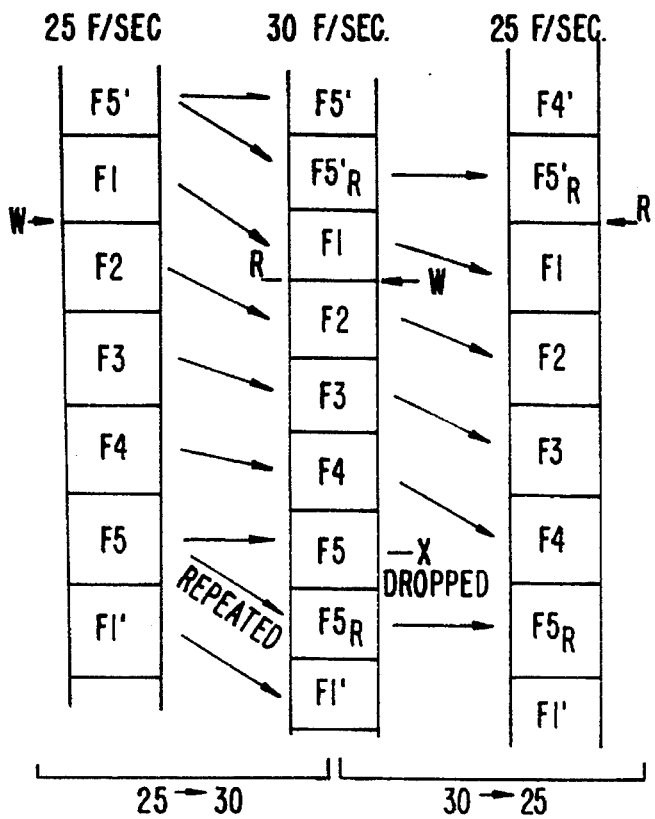
FIG. 3.

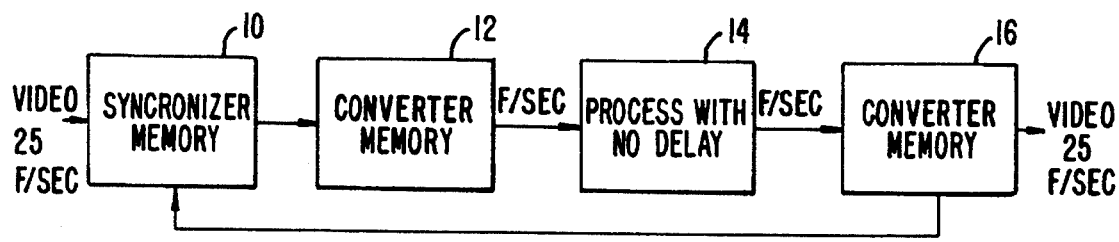
FIG. 4.
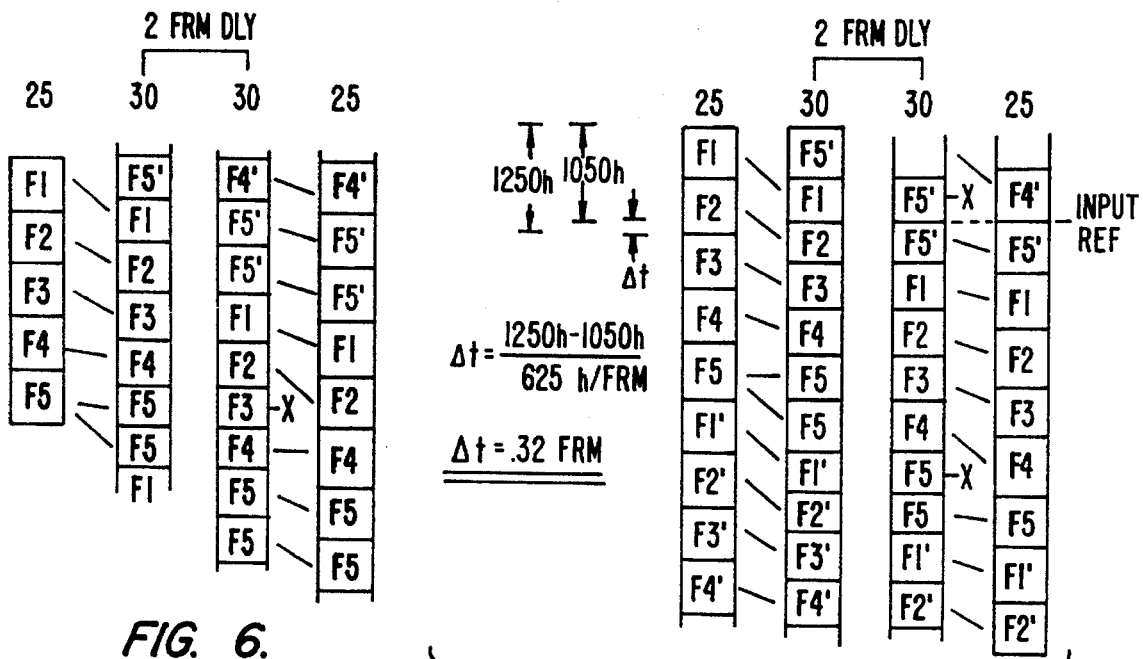
FIG. 6.
FIG. 7.
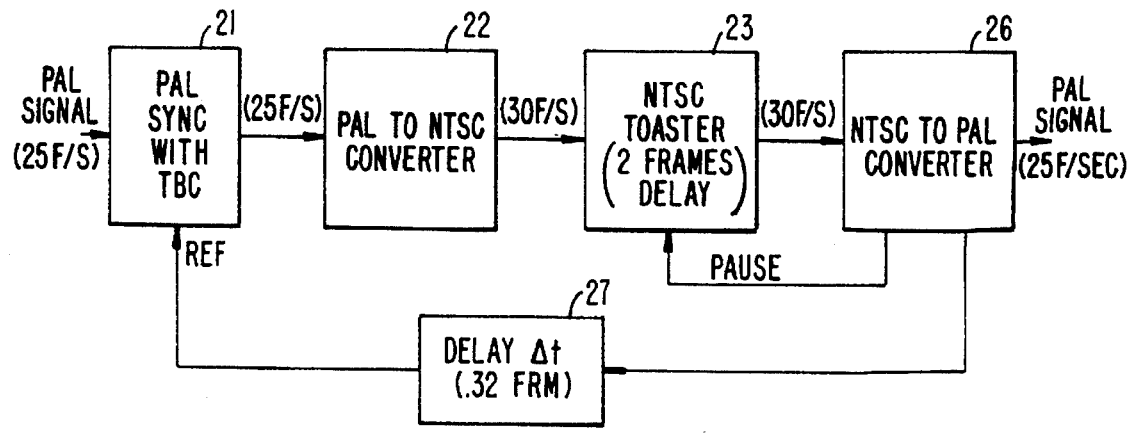
FIG. 5.

ns of th# DOUBLE VIDEO STANDARDS CONVERTER

BACKGROUND OF THE INVENTION

This invention relates to video signal processing devices. More particularly, this invention relates to video signal processing devices for converting video signals from one format to a second format.

Video standard conversion is a known technique used to convert video signals from one standard to another. Typically, video programming material prepared according to a first standard (e.g. NTSC encoded signals) must be converted to another different standard (e.g. PAL or SECAM) in order to render the programming material compatible with the signal processing equipment for the converted standard. For example, if a program has been recorded using the NTSC format, the video signals recorded on the tape are incompatible with a VCR designed to process PAL or SECAM formatted signals. Consequently, the NTSC version must first be converted to the PAL or SECAM standard and then recorded or displayed. Similarly, video programming information which is broadcast using signals encoded according to a PAL format cannot be received and displayed with SECAM or NTSC equipment. Such signals must first be converted from the PAL standard to the standard used by the receiving equipment.

The basic requirement for standards conversion is to change the frame repetition rate and the number of lines per frame to different values required by the standard to which the signals are being converted. NTSC formatted signals, for example, have a frame rate of 30 frames per second and 525 lines per frame. SECAM formatted signals have a frame repetition rate of 25 frames per second and 625 lines per frame. Thus, to convert from NTSC to SECAM formatted signals, the frame repetition rate must be changed from 30 frames per second to 25 frames per second, and the number of lines per frame must be changed from 525 lines to 625 lines. To reduce the frame rate, some frames must be deleted on a predictable basis. Correspondingly, to increase the total number of lines, 100 lines must be added to each frame. When discarding the frames, averaging techniques are typically used in order to avoid the jerkiness which would result if a single frame were simply discarded abruptly. Similarly, when adding lines, the new lines are usually created by averaging adjacent lines in order to avoid distortions of the frame image and to provide a full span of information in the vertical direction.

When converting signals from PAL or SECAM format to NTSC format, the frame rate must be increased by 5 frames per second and the line rate must be decreased by 100 lines per frame. The frame rate increase is normally handled by averaging adjacent frames on a periodic basis to create interpolated frames; while the line decrease is usually done by averaging some adjacent lines to create interpolated lines. While line averaging does not substantially impair the image quality, both interframe averaging and interpolation tend to reduce the resolution of the individual frames affected and introduce artifacts which can be quite noticeable to the viewer. In many instances, the interframe averaging effects accumulate, which causes further degradation in the picture resolution.

Typically, known standards conversion techniques have been used in the past to change the format of video signals from one standard to another to provide compatibility between foreign signals and domestic equipment. Recently, however, a new problem has arisen in connection with a special effects video processor unit which has recently become available. This special effects processor unit, which is sold under the trademark "Video Toaster" by NewTek has achieved acceptance and success in the marketplace as a relatively low cost special television production system capable of a wide variety of standard and custom special effects. In particular, at a relatively low cost, the Video Toaster device can produce special effects heretofore only possible with units selling for nearly ten times the price of the Video Toaster unit. Special effects such as dissolves, wipes, fades and keying can all be done using the Video Toaster unit in combination with a relatively low cost personal computer.

A significant disadvantage of the Video Toaster unit lies in the fact that the unit is only compatible with NTSC formatted video signals. Thus, applications of the Video Toaster unit have been limited to video signals formatted according to the NTSC standard. Efforts to combine a conventional standards converter with the Video Toaster processing unit have not been successful due to the introduction into the original video signals of unacceptable judder and resolution degradation. This is due to the manner in which known standards converters normally operate by interframe averaging and interpolation. Since the purpose of the Video Toaster unit is to manipulate video signals from at least two sources having different programming content, lack of judder and high resolution are important characteristics of the resulting processed signals. Ideally, no artifacts should be introduced into the video signals during special effects processing, and the resolution should be equal to that of the input video signals. This problem is exacerbated by the requirement of a second standards converter, which is needed to convert the processed signals output from the Video Toaster unit back to the original format, and which adds another layer of image degradation.

SUMMARY OF THE INVENTION

The invention comprises a double video standards converter which overcomes the limitations noted above with known standards converters, which requires no interframe or interfield averaging techniques in converting the signals from one format to another, and which is fully compatible with the Video Toaster signal processing unit and other signal processing devices compatible with only NTSC input video signals.

From a process standpoint, the invention comprises the method for processing video signals formatted according to a first standard by converting the input video signals to equivalent video signals formatted according to a second standard, processing the equivalent video signals to develop intermediate video signals formatted according to the second standard, and converting the intermediate video signals to resulting video signals formatted according to a third standard, which is preferably in the same format as the first standard.

When the first standard has a frame rate slower than the second standard, the first step of converting includes a step of periodically repeating a frame or field of the input video signals to supply a redundant additional frame with no new information content. When the third standard has a frame rate slower than the second standard, the second step of converting includes a step of periodically deleting a frame or field of the intermediate video signals to remove a repeated frame or field. When the first and third standards have the same format, the step of periodically deleting is performed on the additional frame or field.

When the step of processing includes the step of modifying the information in at least some of the frames of the equivalent video signals, one of the two steps of converting includes a step of providing a halt processing signal for preventing processing of a repeated frame.

When the step of processing includes the step of introducing a delay in the equivalent video signals, the method further includes the step of compensating for the delay.

From an apparatus standpoint the invention comprises a system for processing video signals formatted according to a first standard prior to intermediate processing by circuitry compatible with signals formatted according to a second standard and for converting the intermediate video signals resulting from the intermediate processing to video signals formatted according to a third standard. The system includes input terminal means for accepting input video signals formatted according to a first standard, means coupled to the input terminal means for converting the input video signals to equivalent video signals formatted according to a second standard, the first converting means including an output terminal for furnishing the equivalent video signals to an intermediate processing device, and second converting means having an input terminal for receiving intermediate video signals formatted according to the second standard for converting the intermediate video signals to resulting video signals formatted according to a third standard. Preferably, the third standard has the same frame rate as the first standard, and the first standard has a frame rate slower than the second standard. The first converting means includes means for periodically repeating a frame or field of the input video signals to supply an additional frame or field. The third standard preferably has a frame rate slower than the second standard, and the second converting means includes means for periodically deleting a frame or field of the intermediate video signals to remove a repeated frame or field. The means for periodically deleting a frame operates to delete the additional frame when the first and third standards have the same frame rate.

For those cases in which the intermediate processing device modifies the information in at least some of the frames of the equivalent video signals, one of the first and second converting means includes means for providing a halt processing signal for preventing processing of a repeated frame. For those applications in which the intermediate signal processing device introduces a delay in the equivalent video signals, the system includes means for compensating for the delay.

By avoiding the use of interframe averaging and interpolation for the frame rate conversion, no artifacts are introduced into the original input video signals, and the resolution of the output signals is essentially the same as that of the input signals unless the intermediate signal processing employed deliberately degrades the resolution of the original signals (e.g. by introducing mosaics or other special effects intended to change the resolution of the image). The invention is implemented using readily available, low cost analog and digital circuitry and can be configured to convert signals in any format to signals in the higher frame rate format prior to the intermediate signal processing. In addition, the format of the output signals need not be identical to that of the original input signals, but need only have the same frame rate.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a schematic diagram illustrating frame rate conversion from a slower frame rate to a faster frame rate;

FIG. 2 is a diagram similar to FIG. 1 illustrating frame rate conversion from a faster frame rate to a slower frame rate;

FIG. 3 is a diagram similar to FIG. 1 showing the combination of double standards conversion;

FIG. 4 is an illustrative block diagram illustrating pointer alignment;

FIG. 5 is a block diagram of the preferred embodiment of the invention; and

FIGS. 6 and 7 are diagrams similar to FIG. 3 illustrating delay compensation.

DESCRIPTION OF THE PREFERRED EMBODIMENTS

The preferred embodiment of the invention is implemented in such a manner that the standards conversion takes place in the digital domain. Consequently, the input video signals are first processed in a conventional manner in the analog domain, are then converted to digital form and stored in this form in memory. A block of memory is used to store one frame of video. The memory is arranged in such a manner that address 0 is the address for the first pixel in field 1, address 1 is the second pixel in field 1, etc. The pixel samples are stored field sequentially; i.e., field 2 follows field 1.

The position (address) in which a pixel is stored (written) or from which a pixel is recalled (read) is termed the pointer. For synchronization and scan rate conversion, two pointers are required: a write pointer and a read pointer. With these two pointers, a specific pixel or group of pixels can be read out from memory at a different time or at a different rate from which the same pixels were written into memory. As an example, assume that the write and read pointers are moving at the same clock rate. If the read pointer starts at address 10 and the write pointer starts at address 20, then the frame of video read from the memory block will be ten clock periods later in time than when the frame of video was written, i.e., the frame will be delayed by ten clock periods.

Now assume that the write and read pointers are moving at different clock rates. If the read pointer is clocked at a slightly slower rate than the write pointer, then the delay of the video read will gradually get larger. If the read pointer is clocked at a slightly faster rate than the write pointer, then the delay of the video read will gradually reduce. In either case, eventually the read and write pointers will come into exact alignment, which is defined as a pointer crossing. If the read pointer is moving faster than the write pointer, and the pointers cross, then the video read from memory will go from no delay (i.e., information read immediately after having been written) to maximum delay (information read from a pixel position before a new pixel has been written to the same position). The gross effect of this pointer crossing is the repetition of one frame of video.

Similarly, if the write pointer is moving faster than the read pointer, and the pointers cross, then the video read from memory will go from maximum delay (information read immediately before a new pixel has been written) to no delay (information read from a pixel position just after new pixel information has been written into that position). When this happens, the frame of information that was just written will never be read, thus having the effect of dropping one frame of video.

FIG. 1 illustrates how the above discussion applies to standards conversion from input video signals having a frame rate of 25 frames per second to one having a frame rate of 30 frames per second. FIG. 1 illustrates frames of video occurring along a vertical time axis. The common time divisor of 30 and 25 frames per second is 1/5th second. In this span of time, six frames at 30 frames per second will occur every five frames at 25 frames per second. Consequently, a frame must repeat every five frames. In FIG. 1, the write pointer designated with W and the read pointer designated with R are shown at the top of the figure. It is assumed that the read pointer is slightly (one clock period) ahead of the write pointer. Since the read pointer is reading just before the write occurs, there is a maximum delay and thus an old frame is being read. Since the read pointer advances faster than the write pointer, the amount of delay between the write pointer and the read pointer gradually decreases. By the time the read pointer has reached the frame F5, it is very close to the position of the write pointer. At the end of frame F5, the pointers are in alignment and there is no delay. At this time, the read pointer crosses the write pointer and returns to the maximum delay condition. As a result, frame F5 is repeated. This process continues on a cyclical basis.

FIG. 2 illustrates conversion from a faster frame rate of 30 frames per second to a slower frame rate of 25 frames per second. Again, the write and read pointers designated with W and R, respectively, are shown at the top of the figure. In this case, the slight advance of the read pointer over the write pointer results in minimum delay. As the process continues, the write pointer moves faster than the read pointer so the delay gradually increases to the maximum. When the write pointer crosses the read pointer, a frame is skipped over and thus dropped.

FIG. 3 illustrates how these two operational characteristics are combined in the invention. FIG. 3 illustrates a double conversion process in which input signals presented at a frame rate of 25 frames per second are first converted to signals having a frame rate of 30 frames per second and then converted a second time back to the original 25 frames per second rate. It is understood that, after the first conversion, the video signals are supplied to appropriate video signal processing devices, such as a Video Toaster unit, for the special effects processing or other processing of which the processing device is capable, after which the processed signals are then converted back to a standard having the original frame rate. As seem in FIG. 3, during conversion from the 25 frames per second standard to the 30 frames per second standard, a frame is repeated as described above with reference to FIG. 1. When converting the 30 frame per second standard to the 25 frames per second standard, a frame is dropped. Thus, it is possible to align the pointers of both conversion techniques in such a manner that the dropped frame is the same as the repeated frame. Initially the write pointer W in the left vertical column is in exact alignment with the read pointer R in the right vertical column. Additionally, the read pointer in the center column is in exact alignment with the write pointer in the center column. Under these conditions, the dropped frame will be the repeated frame. As a consequence, the final video signal resulting from the second conversion has exactly the same frame sequence as the input video signals. It is important to note that the frame conversion process preserves the frame integrity, and uses no averaging or interpolation techniques in converting from one frame rate to another. This significant advantage eliminates the adverse effects found in prior art devices and techniques when converting from one standard to another.

FIG. 4 is a schematic block diagram illustrating the double write/read read/write pointer synchronization. As seen in this figure, a synchronizer memory 10 has an input for receiving digitized versions of the input video signals at the 25 frames per second frame rate. The synchronizer memory 10 is coupled to a first converter memory 12 forming part of the first converter in which the 25 frames per second to 30 frames per second conversion is effected. The output of the converter memory 12 is coupled to the intermediate signal processor 14 at the 30 frames per second rate. The output from the processor 14, which is also presented at a 30 frames per second rate, is coupled to a second converter memory 16 forming part of the second standards converter in which the signals are converted back to the original frame rate of 25 frames per second. The first converter memory 12 and second converter memory 16 are synchronized by means of a feedback path between the second converter memory 16 and the input synchronizer memory 10 in order to provide the pointer alignment noted above.

FIG. 5 is a block diagram illustrating one channel of the preferred embodiment of the invention used to convert PAL input video signals to NTSC formatted video signals prior to processing by a Video Toaster unit, and used to convert the processed signals output from the Video Toaster unit back to the same PAL format at the same original frame rate. As seen in this figure, an input synchronizer 21 is supplied with the input video signals formatted according to the PAL encoding format, which has 25 frames per second frame rate. The synchronizer 21 is a combined digital time base corrector/ synchronizer which performs time base correction on the input signals and synchronizes these signals with the signals generated by the output converter 26.

The signals output from synchronizer 21 are coupled to a first standards converter 22 in which the input signals are converted from PAL formatted signals to NTSC formatted signals with a frame rate of 30 frames per second. The signals output from converter 22 are coupled to the Video Toaster unit 23 for appropriate special effects or post-production signal processing. The signals output from Video Toaster unit 23 are coupled to the input of a second converter 26 in which the NTSC formatted input signals are converted back to the PAL formatted output signals with a frame rate of 25 frames per second.

Since the Video Toaster unit 23 introduces a two-frame delay to signals input thereto, the pointer references supplied from the output converter 25 must be delayed accordingly prior to being supplied to the input synchronizer 12. This delay is provided by a standard delay unit 27 which introduces a delay of 0.32 frame to the pointer reference.

FIGS. 6 and 7 illustrate the effect of the introduction of a two frame delay by the intermediate processing unit 23, without compensation (FIG. 6) and with compensation (FIG. 7). As seen in FIG. 6, during the second standards conversion, frame F3 (marked with x) is erroneously deleted, absent delay compensation. FIG. 7 illustrates that the correct frame F5 (also marked with x) is deleted when delay compensation is provided. The amount of delay compensation required is calculated in the manner illustrated, and is seen to be 0.32 FRM, where FRM is the duration of the input signal frame.

It should be noted that some intermediate signal processors 23 have the capability of processing signals both with and without delay; i.e., some types of processing entail a predetermined delay while other types of processing introduce no delay. In such applications, the delay compensation can be switched on and off to match the delay/no delay processing conditions. This can be accomplished by coupling a control signal from the intermediate signal processor 23 to the delay unit 27, the control signal signifying the delay/no delay state of the unit 23. For units 23 having the capability of providing intermediate signal processing with different amounts of delay introduction, the control signal can specify the amount of delay to the unit 27.

Since the successive frames of video supplied to the Video Toaster unit 23 include repeated frames, it is important that any signal processing conducted in unit 23 not be applied to any repeated frame. For example, assume that the Video Toaster unit 23 is performing a wipe effect on a frame by frame basis. If the repeated frame were subject to this processing, and later deleted by the output converter 26, the missing frame would create a discontinuity in the wiping motion between the leading frame and the following frame, now adjoining in the output signals. To eliminate this adverse effect, output converter 26 generates a pause signal which is supplied to the Video Toaster unit 23 whenever a repeated frame is in position or is presented to the Video Toaster unit 23. This pause signal alerts the Video Toaster unit 23 that the repeated frame should not be processed but should simply be ignored or permitted to pass through the unit unaltered. As a consequence, the frame following the repeated frame will be subjected to the next stage of special effects processing in Video Toaster unit 23, with the result that the output signals will exhibit continuous effects.

The above described invention can be implemented using conventional video processing circuitry such as high speed clocks, analog to digital converters, digital to analog converters, digital memories of sufficient capacity and speed and capable of simultaneous write/read operations. Such circuits are well-known to those of ordinary skill in the art.

While the above provides a full and complete disclosure of the preferred embodiment of the invention, various modifications, alternate constructions and equivalents may be employed. For example, while the invention has been described with reference to PAL input video signals and NTSC intermediate signals, signals formatted according to other techniques can be employed as well, such as SECAM and PAL N signals. In general, the invention applies to signals for which the input signal frame rate is less than the intermediate signal frame rate (or the frame rate required for the intermediate signal processing unit), and the output signal frame rate is the same as the input signal frame rate. Thus, the input signals may be PAL, the intermediate signals can be NTSC and the output signals can be PAL N. In addition, while the preferred embodiment has been described with reference to a single input for the video signals to be standards converted, it is understood that at least two input channels are usually provided so that two or more sources of programming material can be standards converted, processed and standards converted again. Also, while the invention has been implemented in the preferred embodiment by repeating an actual frame and subsequently deleting the same repeated frame, a dummy frame may be inserted and subsequently deleted, if desired. Further, while the invention has been described with reference to a preferred embodiment which operates on a frame-by-frame basis, the invention can also be implemented on a field-by-field basis, with fields being inserted and deleted at twice the frame rate for the video signals employed. Therefore, the above description and illustrations should not be construed as limiting the scope of the invention, which is defined by the appended claims.

What is claimed is:

1. A method for processing video signals formatted according to a first standard, said method comprising the steps of:

(a) providing input video signals formatted accorded to a first standard having a first frame rate;

(b) converting said input video signals to equivalent video signals formatted according to a second standard having a second frame rate, said first frame rate being lower than said second frame rate, said step of converting including the step of periodically repeating a frame of said input video signals to supply an additional frame;

(c) processing said equivalent video signals to develop intermediate video signals formatted according to said second standard, said step of processing including the step of modifying the information in at least some of the frames of the equivalent video signals; and (d) converting said intermediate video signals to resulting video signals formatted according to a third standard, said step (d) of converting including the step of periodically deleting a frame of said intermediate video signals to remove each additional frame, one of said steps (b) and (d) of converting including the step of providing a halt processing signal for preventing processing of each additional frame.

2. The method of claim 1 wherein said third standard has the same frame rate as said first standard.

3. A system for processing video signals formatted according to a first standard prior to intermediate processing by circuitry compatible with signals formatted according to a second standard and for converting the intermediate video signals resulting from the intermediate processing to video signals formatted according to a third standard, said system comprising:

input terminal means for accepting input video signals formatted accorded to a first standard having a first frame rate;

first converting means coupled to said input terminal means for converting said input video signals to equivalent video signals formatted according to a second standard having a second frame rate, said first frame rate being lower than said second frame rate, said first converting means including means for periodically repeating a frame of said input video signals to supply an additional frame, and an output terminal for furnishing said equivalent video signals to an intermediate processing device; and second converting means having an input terminal for receiving intermediate video signals formatted according to said second standard for converting said intermediate video signals to resulting video signals formatted according to a third standard, said second converting means including means for periodically deleting each additional frame from said intermediate video signals, one of the first and second converting means including means for providing a halt processing signal for preventing intermediate processing of an additional frame.

4. The apparatus of claim 3 wherein said third standard has the same frame rate as said first standard.

5. A method for processing video signals formatted according to a first standard, said method comprising the steps of:
- (a) providing input video signals formatted according to a first standard having a first frame rate;
- (b) converting said input video signals to equivalent video signals formatted according to a second standard having a second frame rate, said first frame rate being lower than said second frame rate, said step of converting including the step of periodically repeating a frame of said input video signals to supply an additional frame;
- (c) processing said equivalent video signals to develop intermediate video signals formatted according to said second standard, said step of processing including the step of introducing a delay in the equivalent video signals;
- (d) converting said intermediate video signals to resulting video signals formatted according to a third standard, said step (d) of converting including the step of periodically deleting a frame of said intermediate video signals to remove each additional frame; and
- (e) compensating for the delay introduced in said step (c) of processing.

6. A system for processing video signals formatted according to a first standard prior to intermediate processing by circuitry compatible with signals formatted according to a second standard and for converting the intermediate video signals resulting from the intermediate processing to video signals formatted according to a third standard, said system comprising:
- input terminal means for accepting input video signals formatted according to a first standard having a first frame rate;
- first converting means coupled to said input terminal means for converting said input video signals to equivalent video signals formatted according to a second standard having a second frame rate, said first frame rate being lower than said second frame rate, said first converting means including means for periodically repeating a frame of said input video signals to supply an additional frame, and an output terminal for furnishing said equivalent video signals to an intermediate processing device; and
- second converting means having an input terminal for receiving intermediate video signals formatted according to said second standard for converting said intermediate signals to resulting video signals formatted according to a third standard, said second converting means including means for periodically deleting each additional frame from said intermediate video signals; and
- means for compensating for any delay introduced into the equivalent video signals by the intermediate processing device.

* * * * *